(12) United States Patent
Kim (10) Patent No.: US 10,548,360 B2
(45) Date of Patent: Feb. 4, 2020

(54) PROTECTIVE GLOVE AND METHOD OF MANUFACTURING THE SAME

(71) Applicant: Woo Tae Kim, Seoul (KR)

(72) Inventor: Woo Tae Kim, Seoul (KR)

(*) Notice: Subject to any disclaimer, the term of this patent is extended or adjusted under 35 U.S.C. 154(b) by 69 days.

(21) Appl. No.: 15/549,449

(22) PCT Filed: Apr. 18, 2016

(86) PCT No.: PCT/KR2016/004002
§ 371 (c)(1),
(2) Date: Aug. 8, 2017

(87) PCT Pub. No.: WO2016/171438
PCT Pub. Date: Oct. 27, 2016

(65) Prior Publication Data
US 2018/0027903 A1   Feb. 1, 2018

(30) Foreign Application Priority Data
Apr. 20, 2015   (KR) .................. 10-2015-0055172

(51) Int. Cl.
| | | |
|---|---|---|
| *A41D 19/015* | (2006.01) | |
| *A41D 19/04* | (2006.01) | |
| *A41D 19/00* | (2006.01) | |

(52) U.S. Cl.
CPC ..... *A41D 19/01505* (2013.01); *A41D 19/015* (2013.01); *A41D 19/01523* (2013.01);
(Continued)

(58) Field of Classification Search
CPC ............ A41D 19/015; A41D 19/01505; A41D 19/01523; A41D 19/01529;
(Continued)

(56) References Cited

U.S. PATENT DOCUMENTS

| | | | |
|---|---|---|---|
| 6,618,860 B1 * | 9/2003 | Sullivan ............... | A63B 71/141 2/159 |
| 7,406,719 B2 | 8/2008 | Aoki | |

(Continued)

FOREIGN PATENT DOCUMENTS

| | | |
|---|---|---|
| JP | 2008-264366 | 11/2008 |
| JP | 2011-132619 | 7/2011 |

(Continued)

OTHER PUBLICATIONS

International Search Report for International Application No. PCT/KR2016/004002, dated Aug. 26, 2016.

*Primary Examiner* — Amy Vanatta
(74) *Attorney, Agent, or Firm* — Kile Park Reed & Houtteman PLLC (57) ABSTRACT

The present invention provides a protective glove which improves protection and wearability by integrating protective members using features of thermosetting material and thermoplastic material. The protective glove comprises: a body 10 into which a back of hand, a palm and fingers of a wearer are inserted; a first protective member 20 made from thermosetting material, which is formed to protect a predetermined portion of the wearer's hand and exposed to outside and which is integrally attached to an outer surface of the body 10; and a second protective member 30 made from thermoplastic material, which is formed to protect a predetermined portion of the wearer's hand and is integrated with the first protective member 20, and which is attached to the outer surface of the body 10.

4 Claims, 10 Drawing Sheets

(52) U.S. Cl.
CPC .......... *A41D 19/04* (2013.01); *A41D 19/0065* (2013.01); *A41D 19/01517* (2013.01)

(58) Field of Classification Search
CPC .......... A41D 19/0065; A41D 19/01517; A41D 19/0006; A41D 19/01588; A41D 13/081; A41D 13/082; A41D 13/084; A41D 13/087; A63B 71/141; A63B 71/143
USPC ........................................ 2/20, 161.1, 161.6
See application file for complete search history.

(56) References Cited

U.S. PATENT DOCUMENTS

| | | | | |
|---|---|---|---|---|
| 2009/0139011 | A1* | 6/2009 | Vanernnen | A41D 19/01505 2/161.8 |
| 2012/0011633 | A1* | 1/2012 | Van Hale | A41D 19/002 2/20 |
| 2012/0159681 | A1* | 6/2012 | Gibby | A41D 13/0156 2/20 |
| 2012/0216327 | A1* | 8/2012 | Turner | A41D 13/0156 2/69 |
| 2017/0208879 | A1* | 7/2017 | Kim | A41D 19/01523 |
| 2017/0280795 | A1* | 10/2017 | Takagi | A41D 19/01505 |
| 2018/0303176 | A1* | 10/2018 | Lim | G06F 3/014 |
| 2019/0098945 | A1* | 4/2019 | Lim | A41D 19/01517 |

FOREIGN PATENT DOCUMENTS

| | | |
|---|---|---|
| JP | 2014-012923 | 1/2014 |
| KR | 10-2011-0052683 | 5/2011 |
| KR | 10-2011-0115206 | 7/2012 |
| KR | 10-1165213 | 7/2012 |
| KR | 10-2014-0071002 | 6/2014 |

* cited by examiner

FIG. 1 (Prior Art)

A-A cross-section

FIG. 2 (Prior Art)

B-B cross-section

FIG. 3 (Prior Art)

C-C cross-section

PROTECTIVE GLOVE AND METHOD OF MANUFACTURING THE SAME

FIELD OF THE INVENTION

The present invention is related to a protective glove. Particularly, the present invention is related to the protective glove integrated with protective members, which are made from thermosetting material and thermoplastic material, respectively, to thereby attain improvements in protection and wearability. Also, the present invention is related to a method of manufacturing a protective glove, which attains improvements in productivity and manufacturing.

BACKGROUND OF THE INVENTION

Generally, a glove is being appropriately manufactured and used in various fields of industry and sports as well as in daily life for the purposes of workability, safety, effectiveness, etc., as disclosed in the prior documents below. Also, in order to ensure mobility of the hand and to protect a first and fingers, a work glove that is designed in a special way is being used at a work site, such as, but not limited to, a sand oil mining site and an oil well, wherein work environment is inferior and the safety is important.

Figure 1:
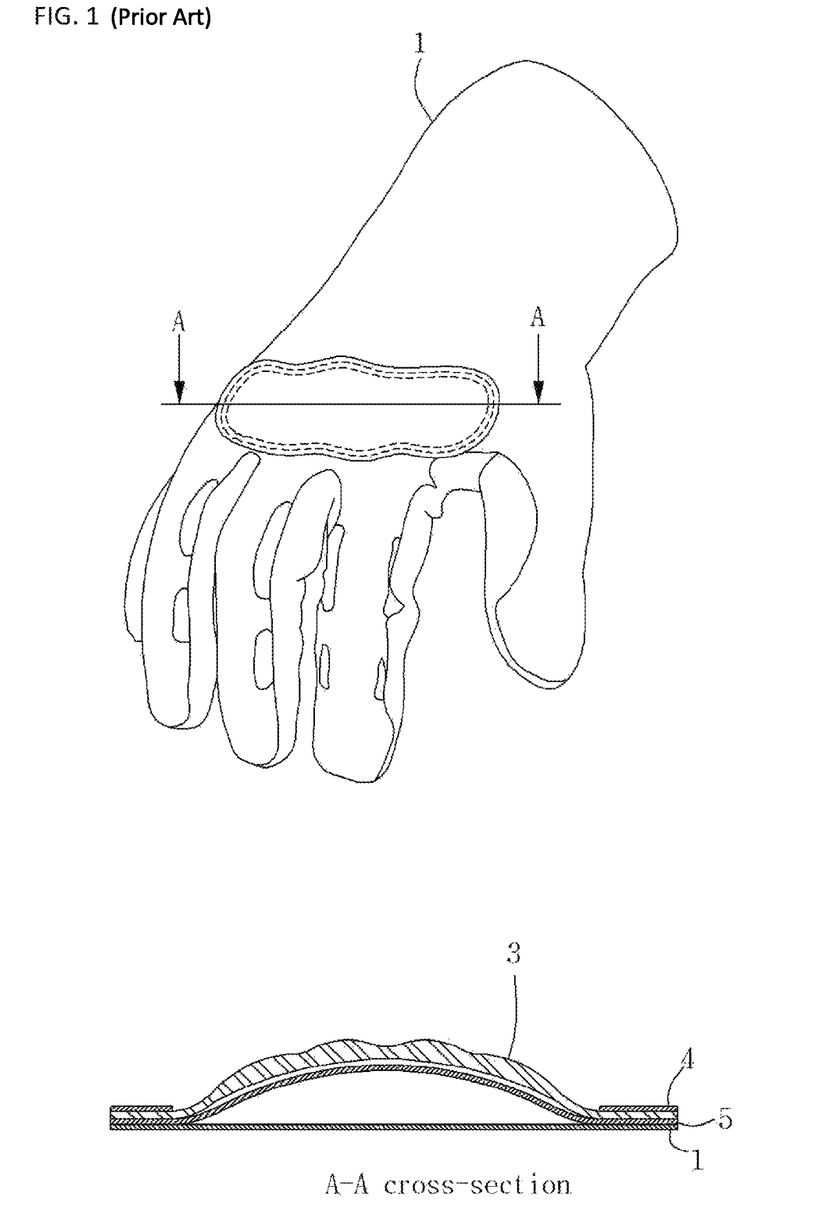
FIG. 1 is a perspective view showing a protective glove of the prior art.

Referring to FIG. 1 showing a general protective glove of the prior art, a body 1, a hard protector 3 disposed on the body 1 for protecting a fist, a fixture 4 for fixing the protector 3 to the body 1, and a sponge 5 disposed around the protector 3 and fixed to the body 1 in order to prevent feeling of foreign matter and injury due to direct contact between the hand and a periphery of the protector 3 are integrated by sewing.

The protective glove that has the above-configuration provides somewhat strong protection against external impacts, but it has the problems. Specifically, the structure of the glove is very complex; the wearability is degraded; the manufacturing is difficult; and the manufacturing cost increases.

Figure 2:
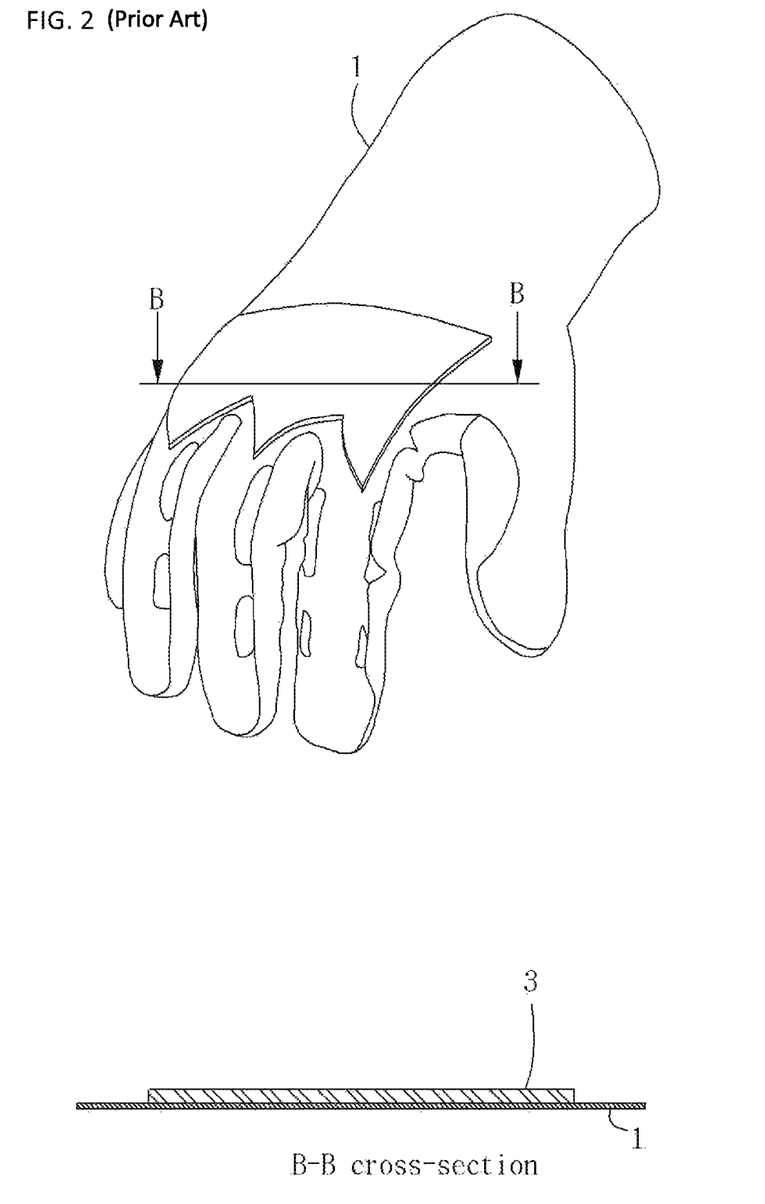
FIG. 2 is a perspective view showing another protective glove of the prior art.

Referring to FIG. 2 showing another protective glove of the prior art, the body 1 or skin 2 of the glove is integrated with the soft protector 3 by means of bonding or heat-pressing to thereby protect the back of a hand and fingers.

The above-described protective glove is easy to manufacture and inexpensive, but the wearability is average and the protection is significantly degraded.

Figure 3:
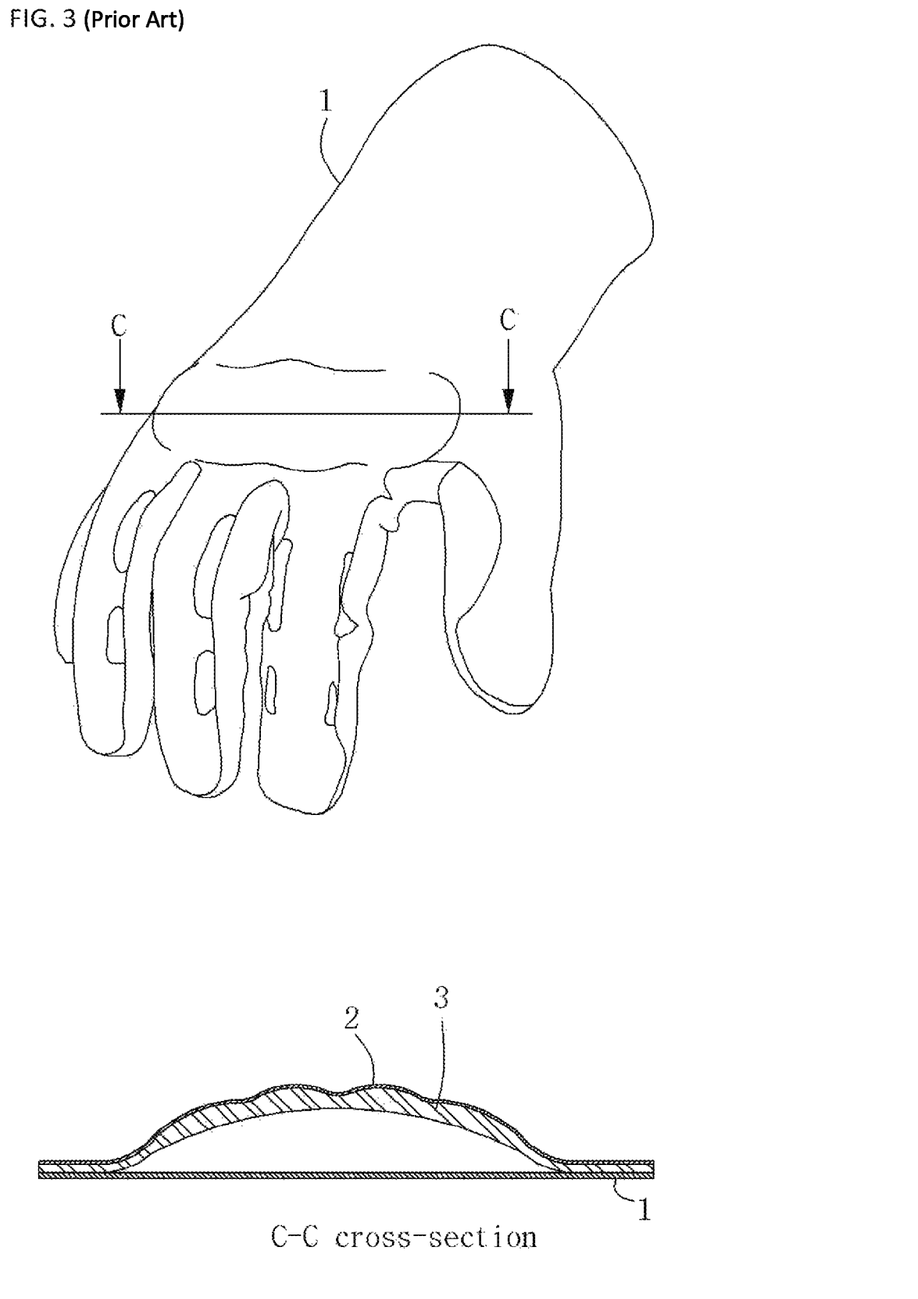
FIG. 3 is a perspective view showing the other protective glove of the prior art.

Referring to FIG. 3 showing the other protective glove of the prior art, the thermoplastic protector 3 is integrated with interior of the skin 2 of the body 1, which has the configuration for protecting, e.g., the fist.

The above-described protective glove has the relatively simple structure and the improvement in protection, but the periphery of the protector might cause injury to the wearer's hand, so that the wearability and the safety could be degraded. Further, it has the problems, such as increase in manufacturing cost and significant decrease in productivity.

Consequently, the general protective glove of the prior arts appears to cause various kinds of the problems. Specifically, since the protective member, i.e., the protector is attached to the body of the glove by means of sewing or bonding, it causes the problems like irregular quality and degraded appearance.

Also, a method of integrating the protective member with the body using a press processing comprises pressing and attaching the protective member having a completed form, and thus, the wearability as well as the integrity with the body is degraded.

Moreover, each protective member is made from hard and heavy material, which leads to the degradation in the wearability and the fatigue accumulation.

PRIOR ARTS

U.S. Pat. No. 7,406,719B
KR101165213B
JP2008264366A
KR1020110115206A

SUMMARY OF THE INVENTION

The present invention is to address the above-stated problems, and thus, the object of the present invention is to provide a protective glove and a method of manufacturing glove, wherein protective members are precisely and stably integrated with a body of the glove using thermo-chemistry and physical properties of thermosetting material and thermo and thermoplastic material, to thereby obtain superior marketability, improved wearability, simple configuration and improved productivity.

The object of the present invention is achieved by a protective glove comprising: a body into which a back of hand, a palm and fingers of a wearer are inserted; a first protective member made from thermosetting material, which is formed to protect a predetermined portion of the wearer's hand and exposed to outside and which is integrally attached to an outer surface of the body along a periphery of bottom surface of the first protective member; and, a second protective member made from thermoplastic material, which is formed to protect a predetermined portion of the wearer's hand and is integrated with an inside of the first protective member, and which is attached to the outer surface of the body on its entire bottom surface.

According to a characteristic of the present invention, the first protective member and the second protective member are integrated with and attached to the body in an integral manner using adhesive.

According to the other characteristic of the present invention, the first protective member and the second protective member are integrated with each other by simultaneous application of heat and hardening within a mold or a forming mold, wherein a bottom area of the first protective member is formed to be greater than that of the second protective member and wherein the first protective member is integrally attached to the body while the periphery of the first protective member completely surrounds the periphery of the second protective member.

According to the other characteristic of the present invention, the integrated first and second protective members resist against folding in a reverse direction of flexion, and accommodate folding in a forward direction of flexion.

The object of the present invention can be achieved by a method of manufacturing a protective glove comprising: a first step for preparing a body of the protective glove; a second step for integrally forming a first protective member and a second protective member on a plane so as to match with a size of a predetermined portion of said body; a third step for applying adhesive to the bottoms of said integrated first and second members and attaching them to a predetermined portion of an external surface of the body on a plane; a fourth step for heating the integrated first and second protective members in order to provide them with formability; a fifth step for pressing and forming the integrated first and second protective members to let them have a curved surface in order to match them with a predetermined portion of a wearer's hand; and a sixth step for drying the integrated first and second protective members and the predetermined portion of the body with the integrated first and second protective members attached thereto in order to complete the protective glove.

According to the other characteristic of the present invention, said second step comprises disposing thermoplastic material for forming the second protective member at a center of a mold, and integrating the first protective member with the second protective material by means of heat application, while disposing thermosetting material for forming the first protective member to completely surround the thermoplastic material.

According to the other characteristic of the present invention, said fourth step is carried out by means of a heating plate or a heater, and wherein a heating temperature is set in such a manner that the second protective member has formability based on thermo-plasticity.

According to the other characteristic of the present invention, said fourth step comprises providing upper and lower molds, pressing and forming the body and the integrated first and second protective members to let them have a curved surface, or pressing the body having the integrated first and second protective members attached thereto against a silicon pad, which has a predetermined thickness and elasticity, by means of a molding press to let them have a curved surface.

Advantages of the Invention

According to the protective glove of the present invention, the protective members are formed using thermo-chemistry of thermosetting material and thermoplastic material and are integrated with the glove. Thus, the present invention has such advantages as improved integrity, compact appearance, improved marketability, improved wearability and improved productivity and manufacturing.

DETAILED DESCRIPTION OF THE INVENTION

Figure 4:
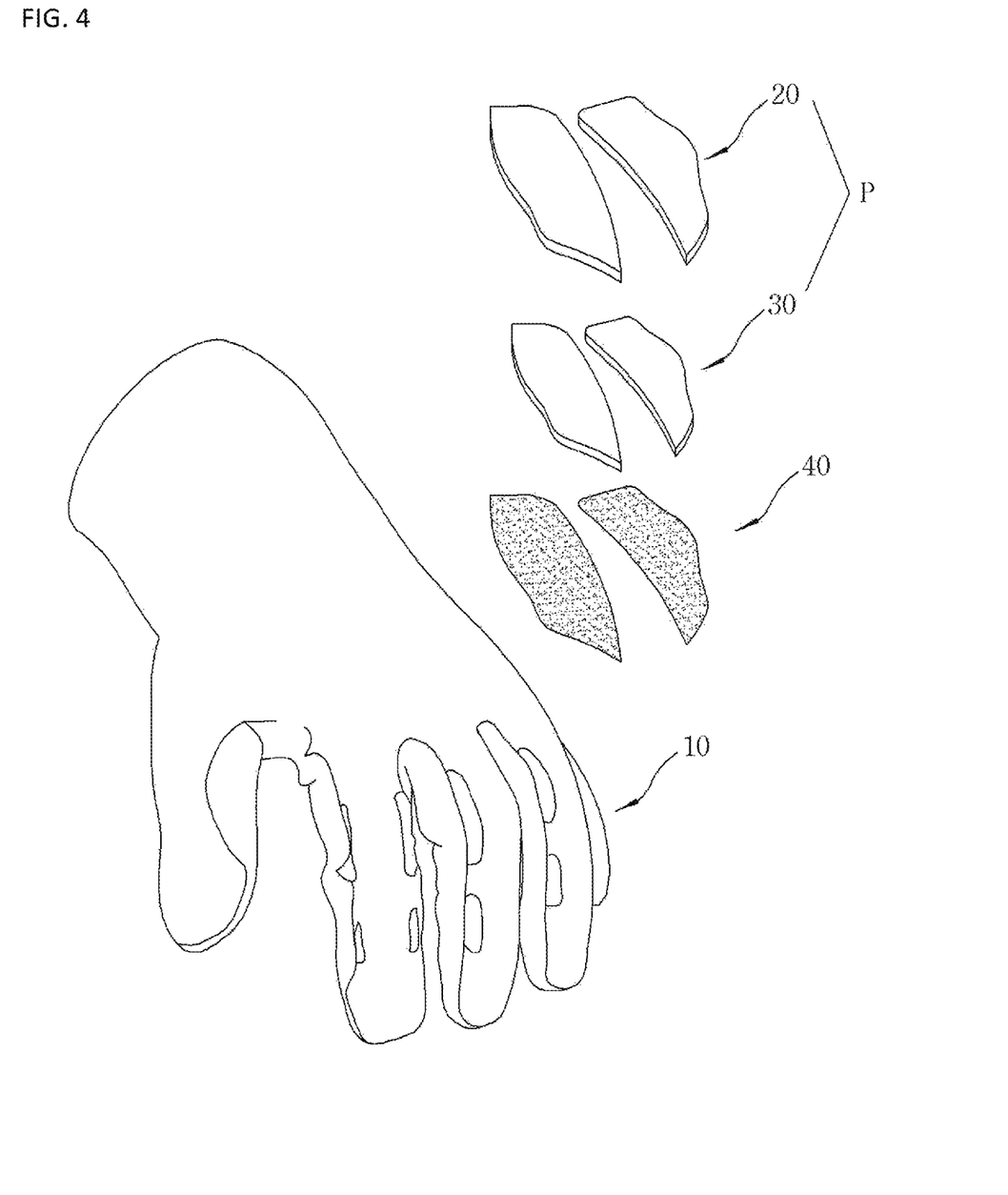
FIG. 4 is an exploded perspective view of a protective glove according to the present invention.

Herein-after, a protective glove according to an embodiment of the present invention will be specifically described with reference to the drawings. In FIG. 4, a first protective member, a second protective member and adhesive comprised in the body of the protective glove are illustrated in a separate state for clarity. However, it will be appreciated that all of these elements are integrated with each other in practice.

Figure 5:
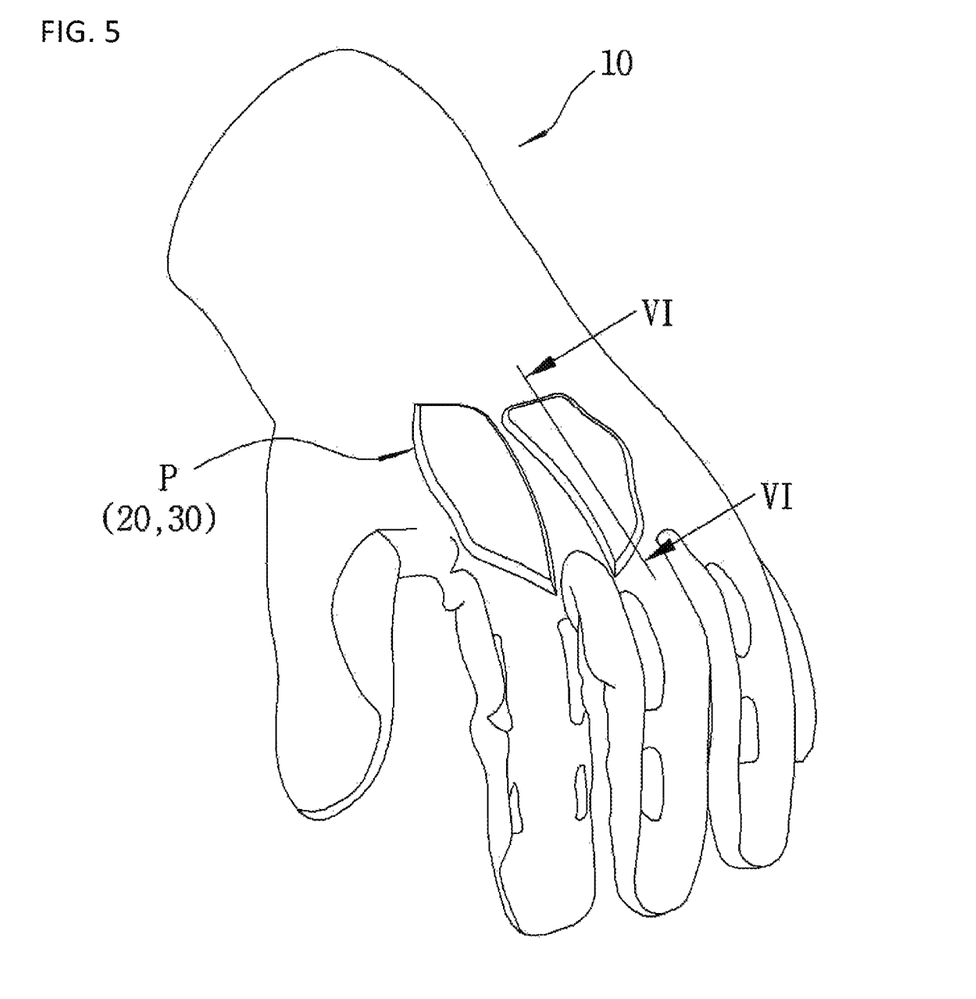
FIG. 5 is a perspective view of FIG. 4.
Figure 6:
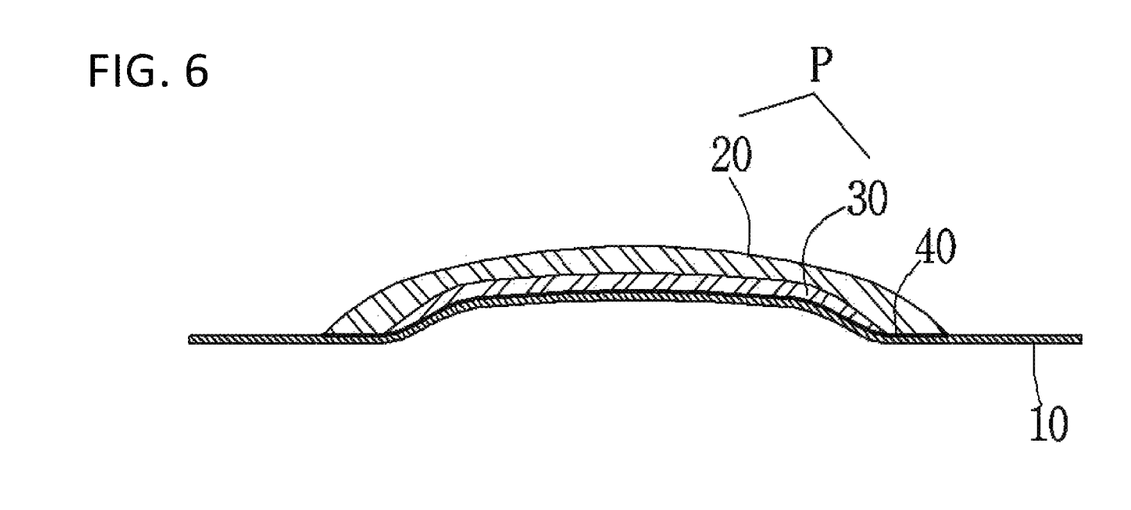
FIG. 6 is a cross-sectional view along a line VI-VI of FIG. 4.

Referring to FIGS. 4-6, the protective glove according to the preferred embodiment of the present invention basically comprises the body 10. The body 10 is formed from a variety of fibers, synthetic resin, etc., according to use or a user's demand and it may have various sizes depending on a size of a wearer's hand.

The body 10 is basically formed to have a body part and finger parts so as to match to a shape of a hand, wherein the body part is communicated with the finger parts. The body part is formed to receive a palm, a back of hand and fist, and the finger parts are formed to receive the fingers.

According to a characteristic feature of the present invention, the body 10 is integrated with a first protective member 20 for protecting the back of hand, the fingers, etc., although this feature does not limit the present invention.

Particularly, the first protective member 20 has its periphery attached to the body 10 in an integrated manner so as to substantially protect a corresponding hand portion of the wearer, wherein the first protective member is preferably made from thermosetting material which can have superior protection for the wearer's hand and which can be maintained in its strength.

The thermosetting material for the first protective member 20 preferably comprises one of epoxy resin, polyester resin, melamine resin, urea resin, polyurethane, ebonite resin and the combination thereof. Also, material for the first protective member 20 is provided in the form of liquid or particle and is heated and cured in a mold or a forming mold, to thereby enable the attainment of the shape or the form of the glove, wherein the mold or the forming mold is for providing a configuration of the first protective member 20 desired by the user or a manufacturer.

According to the other characteristic feature of the present invention, a second protective member 30 is integrally attached to the body 10 inside of the first protective body 20.

Particularly, the second protective member 30 is preferably formed from thermoplastic material, wherein the thermosetting material for the first protective member 20 matches with the thermoplastic material for the second protective material 30 in view of their thermo-chemistry.

Preferably, thermoplastic material for the second protective member 30 may be selected from a group comprising polyamide, polyethylene, polypropylene, polycarbonate and polyethylene terephthalate and a combination thereof, all of which have superiority in strength and repulsive resilience. Material for the second protective member 30 is provided in the form of liquid or particle and is heated and cured in the mold or the forming mold for the first protective member 20 at the same time as the first protective member 20, to thereby attain the shape or the form of the glove, wherein the mold or the forming mold is for providing a configuration of the first protective member 20 desired by the user or a manufacturer.

Here, it is preferable that sizes or dimensions of the second protective member 30 are smaller than those of the first protective member 20. Particularly, a surface area of the first protective member 20, i.e., an area attached to an outer surface of the body 10 is determined to be larger than that of the second protective area 30 to cover or surround the second protective member 30. Accordingly, the first protective member is integrated with a predetermined surface of the body 10, while the periphery of the first protective member 20 completely surrounds the periphery of the second protective member 30.

As a result, an integrated protective member is integrally attached to the body 10, wherein the integrated protective member is formed in such a manner that the first protective member 20 integrally covers or surrounds the second protective member 30, while thermo-chemistry and physical properties of the first and second members are matching or different.

The integrated protective member, which is formed by integrating the first protective member 20 with the second protective member 30, has the shape matching to a specific zone of the wearer's hand. The integrated protective member is integrated with the outer surface of the body 10, so that the wearer's hand may be protected over the specific zone in a comfortable and stable manner.

It is preferred that adhesive 40 is applied between bottoms of the first and second protective members 20 and 30 and a corresponding part of the body 10, so as to integrate the first protective member 20 with the second protective member 30 and attach the integrated protective member to the body 10. Various kinds of the adhesive 40 might be selected for use.

By integrating the first and second protective members 20 and 30 that have the matching or different thermo-chemistry and physical properties and by integrating the protective members with the certain zone of the body 10 using the adhesive 10, the structural and functional features can be obtained as described below.

First of all, the first protective member 20 is made from thermosetting material, so that the completed glove can maintain hardness, and can have a higher impact resistance and improvement in its protection. The second protective member 30 is formed from soft material, so that the wearer can have comfort contact and improvement in the wearability.

With regard to the protection, it is possible to stably protect the wearer's hand, because the resistance is superior against external pressure or external force directing from the external side of the protective members 20 and 30 (a protector P) toward the wearer's hand or the body 10. On the contrary, when the wearer exercises, such as finger bending, flexibility is established around a center of the protective members 20 and 30 or the protector P. Accordingly, degree of freedom for a motion may increase, together with convenience and comfort, so that the wearability is improved.

The protective members 20 and 30 are integrally attached to the matching external surface of the body 10 by means of the adhesive 40 in such a way that the first protective member 20 surrounds the second protective member 30. Particularly, the periphery of the first protective member 20 is attached to the body 10 in such a way that it surrounds the second protective member 30, which is harder and non-deformable. Accordingly, the detachment and the separation of the protective members are prevented, so that it can improve marketability.

Although the present embodiment illustratively describes the protective glove which comprises the body 10 and two protectors P formed from the first and second protective members 20 and 30 for protecting the first and its circumference, the protector P may be provided in any form and at any position where a manufacturer or the wearer wishes to arrange the same, such as the back of the hand, the finger or the side.

As will be readily appreciated by one of ordinary skill in the art, the hardness of the protective members 20 and 30 is pre-determined depending on the properties of the protective glove, so that an appropriate material for such harness is selected and integrated with the body. Accordingly, the wearer is provided with the predefined protection and wearability.

Herein-below, a method of manufacturing a protective glove according to the present invention will be described with reference to FIGS. 7-10 and FIGS. 4-6.

Figure 7:
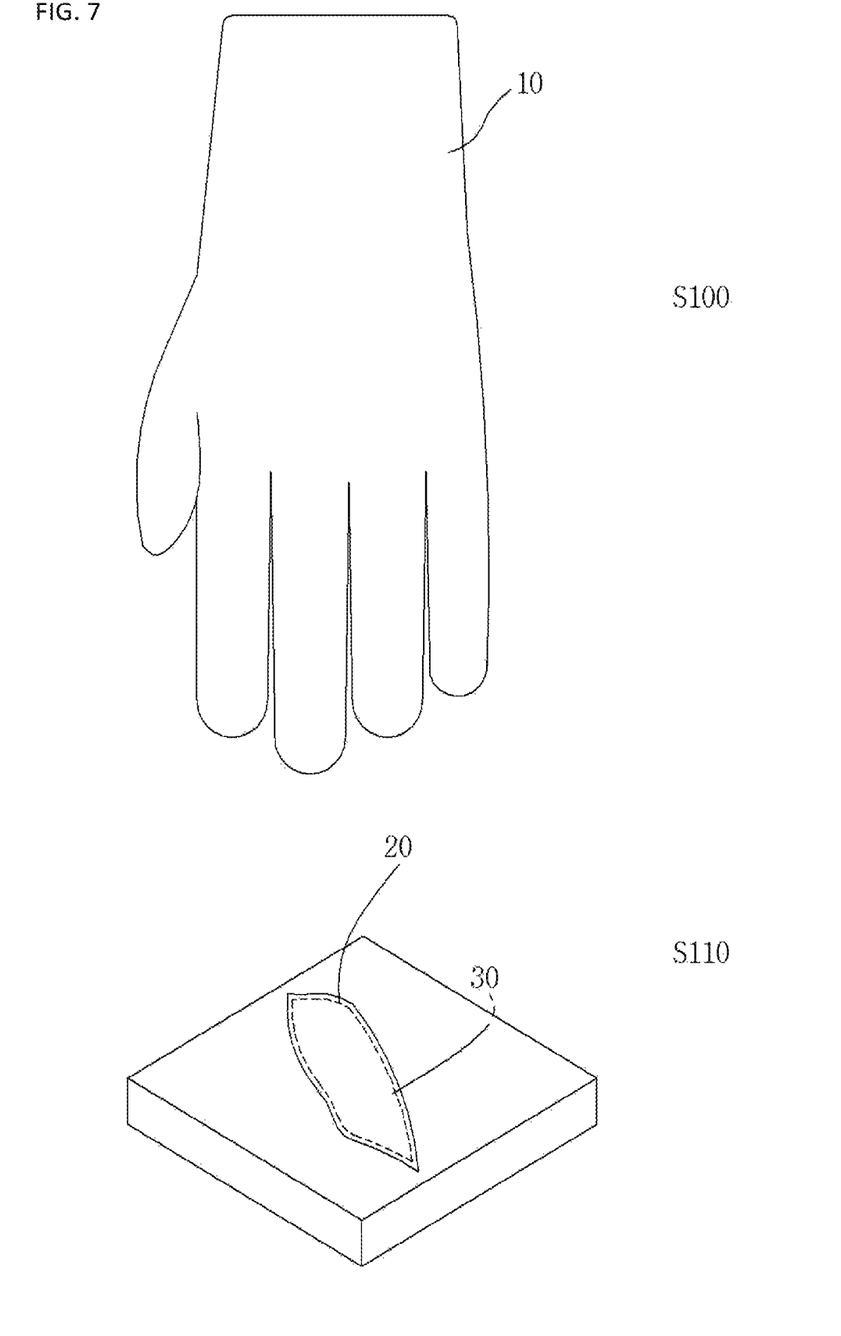
FIGS. 7-10 shows a method of manufacturing a protective glove according to the present invention.

First, a manufacturer prepares the body 10 of the protective glove in accordance with the form or the purpose that the wearer or the user desires (S100: a first step). As described herein-below, the body 10 thus prepared is displayed or marked with a position to which the protective member is attached.

When the body 10 is prepared, the first protective member 20 and second protective member 30 are formed by envisaging a shape corresponding to a predetermined portion or a set up portion of the body 10 (S110: a second step). Here, the first protective member 20 and the second protective member 30 are simultaneously and integrally formed. Specifically, thermoplastic material for the second protective member 30 is placed in a mold M formed with a shape of the predetermined protective member or the protector, and then thermosetting material for the first protective member 20 is placed to completely surround the thermoplastic material. At this state, heat and pressure are applied to thereby integrate the first protective member 20 with the second protective member 30. Here, the first protective member 20 and the second protective member 30 are integrally molded in the mold M, and then they are cooled to thereby form a preparatory protective member or a preparatory protector. Also, the bottoms of the integrated protective members 20 and 30 are such that the periphery of the bottom of the first protective member 20 surrounds the bottom of the second protective member 30 entirely.

Figure 8:
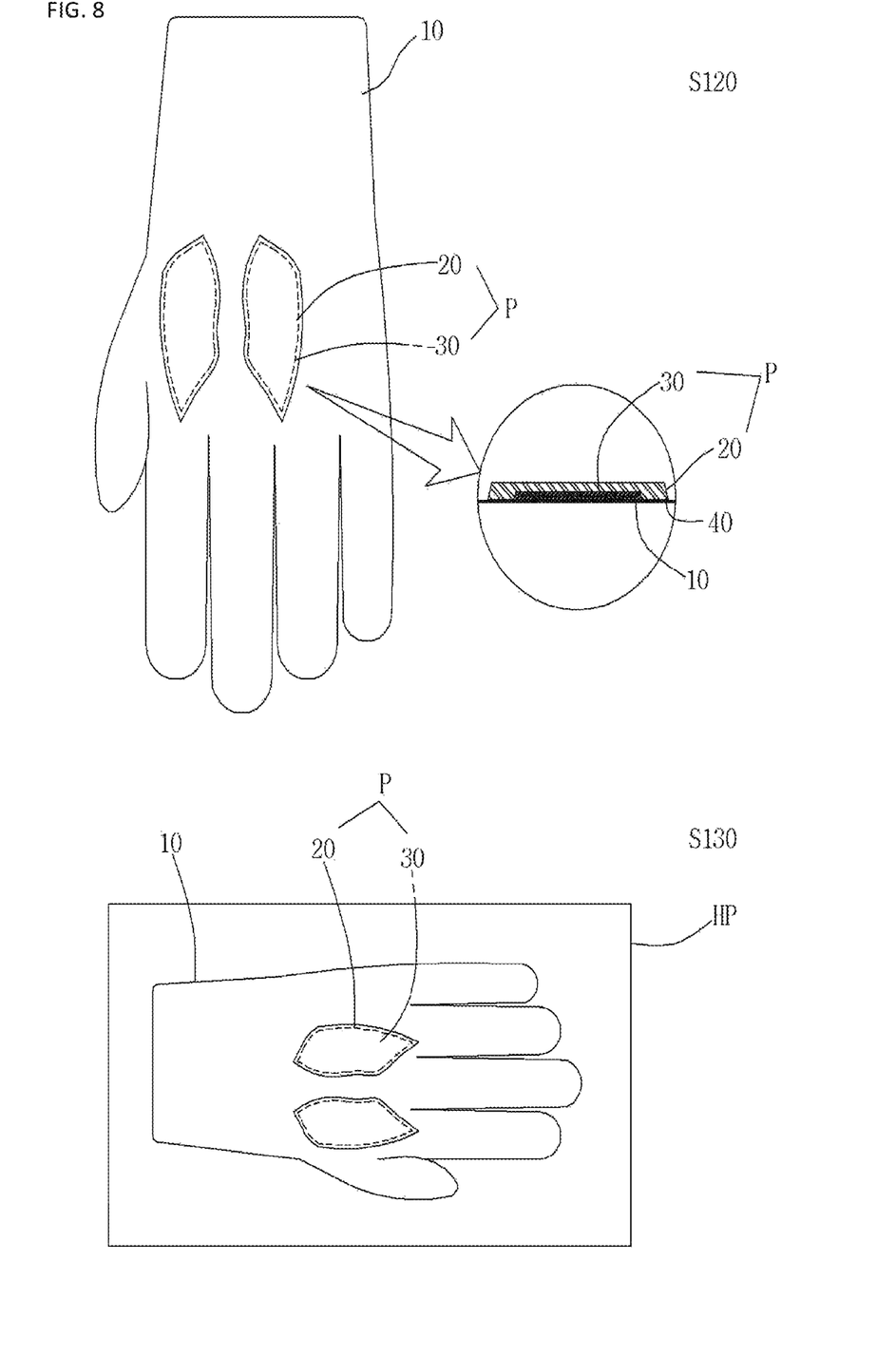

When the protective members 20 and 30 are integrally formed, the adhesive 40 is applied to the bottoms of the protective members 20 and 30, and then the protective members are attached to the external surface of the body 10 at the predetermined position (S120: a third step). Here, it is preferable that the adhesive 40 is applied to the entire bottom of the second protective member 30 as well as the entire bottom of the first protective member 20. With such application of the adhesive 40, an integrated attachment to the body 10 is attained in such a way that the first protective member 20 entirely surrounds the second protective member 30. Particularly, according to a major feature of the present invention, the integrated protective members 20 and 30 are accurately and rigidly attached to the predetermined surface of the body 10, since the integrated protective members 20 and 30 have the flat bottom surfaces.

When the protective members 20 and 30 are attached to the body 10, the protective members 20 and 30 are heated in order to provide the formability of the protective members 20 and 30 (S130: a fourth step). The protective members 20 and 30 are heated by a heating plate HP or a heater. Preferably, a heating temperature is determined in such a way that the second protective member 30 of the integrated protective members is melted or relaxed for providing sufficient formability based on thermo-plasticity. Preferably, the first protective member 20, which has hardening property, is also melted or relaxed within a predetermined range or a limited extent in order to allow the second protective member 30 to be sufficiently molded toward its final shape.

Figure 9:
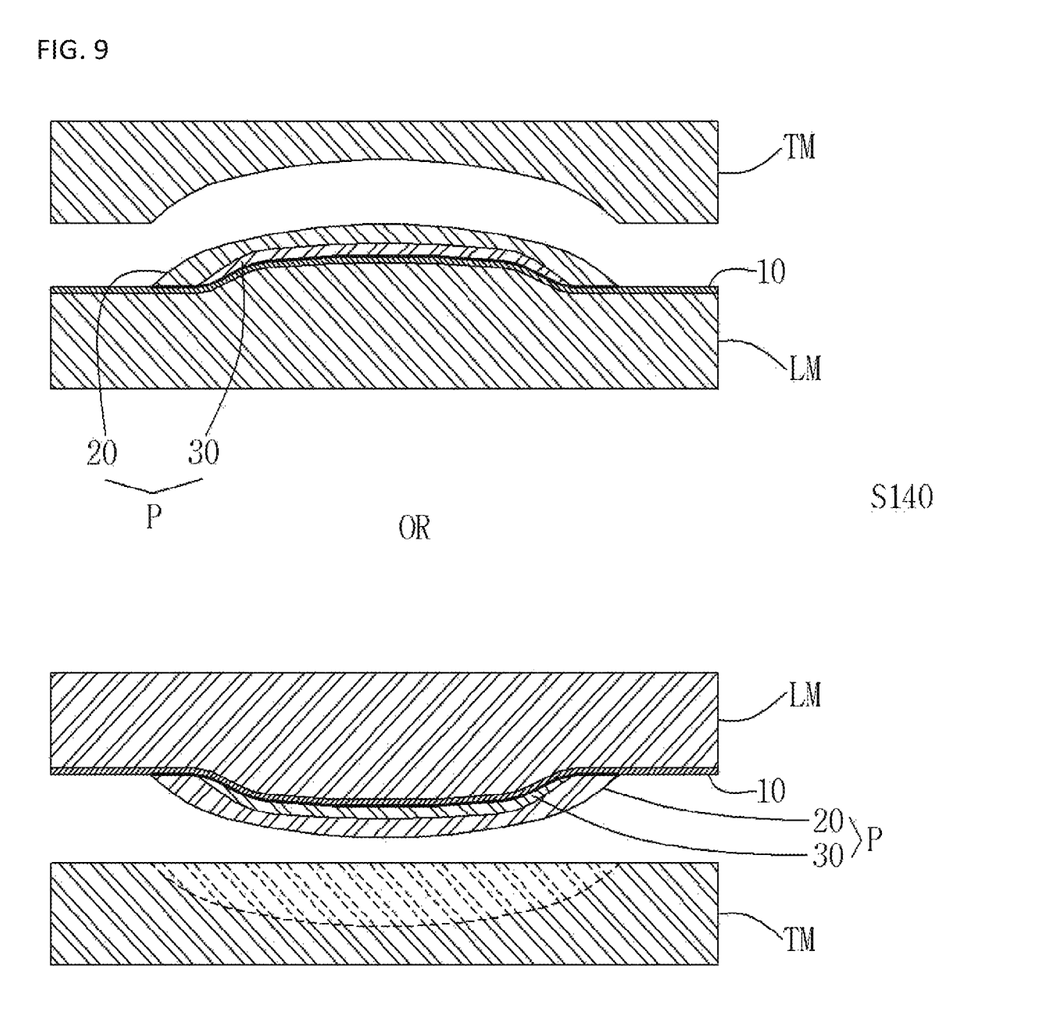

When the second protective member 30 is sufficiently relaxed, the integrated protective members 20 and 30 are formed to have a predetermined shape by pressurizing and molding the protective members 20 and 30 (S140: a fifth step). Here, the protective members 20 and 30 are pressurized and molded in two different ways. For instance, as a way of using a mold, an upper mold TM and a lower mold LM with predetermined configurations are prepared, and each protective member 20 and 30 is applied to the body 10 with pressure to thereby form the integrated protective members 20 and 30 or the protector P. As another way, the body 10 having the protective members 20 and 30 attached thereto is pressed against a silicon pad SP, which has a predetermined thickness and sufficient elasticity, by means of a molding press MP, so that the integrated protective members 20 and 30 or the protector P is formed.

As described before, the second protective member 30 is flexed and molded into a predetermined state by means of the molds TM and LM or the molding press MP and the silicon pad SP due to the thermo-plasticity. At the same time, the first protective member 20 is molded to have the shape corresponding to that of the second protective member 30 by means of the deformation resulting from the application of heat and pressure, to thereby attain the integrated protective members 20 and 30 or the protector P.

Figure 10:
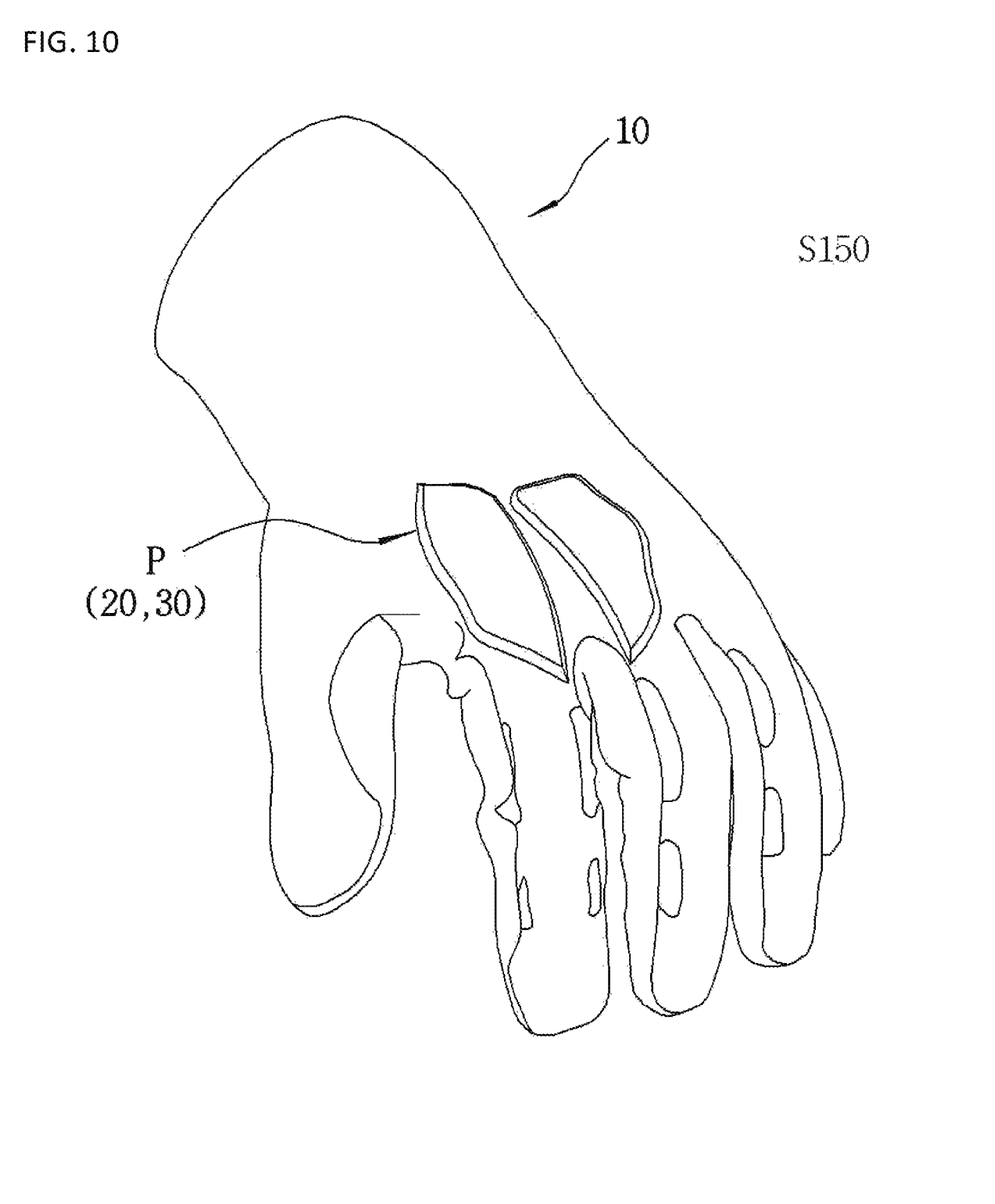

Finally, the glove is removed or separated from the molds TM and LM or the silicon pad SP and then it is dried and cooled at a room temperature or a predetermined temperature to complete the protective glove (S150: a sixth step). After cooling and drying of the protective glove, the protective members 20 and 30 or the protector P integrated with the body 10 are in a completely hardened state, wherein the first protective member 20 is maintained in a soft state, whereas the second protective member 30 is maintained in a hard state. Accordingly, the predetermined form of the protective member or the protector is maintained.

In the manufacturing method as described above, the exemplary protective glove has been described, wherein two protectors P comprising the first and second protective members 20 and 30 attached to the body 10 is intended to protect the first and its circumference and wherein protective members 20 and 30 are integrated with each other to be a single layer. However, it will be apparent to one of ordinary skill in the art that the attachment position of the respective protective members 20 and 30, the hardness thereof and the number of the layer might be selected in many ways depending on the protection and the wearability requested in the protective glove.

According to the method of manufacturing the protective glove of the present invention, the adhesion and the integration are improved by integration of the first and second protective members in an early stage of manufacturing, provision of these members in a flat form and its attachment to the body. Also, the formability is improved due to the thermo-plasticity of the second protective member.

After completing manufacture, the protection is improved due to the hardness and the stiffness of the first protective member, and the wearability is improved due to the softness of the second protective member.

Moreover, the external impact toward the wearer's hand is subjected to the resistance and dispersion in an improved manner, because the integrated protective members have strong resistance against folding in a reverse direction of the flexion, whereas the mobility and the convenience of the wearer's hand are ensured because the integrated protective members have relatively weak resistance against folding in a forward direction of the flexion.

As a result, the protection, the adhesion, the wearability and the manufacturing effectiveness are significantly improved by means of the integrated formation of the first and second protective members and the body according to the protective glove and the method of manufacturing the same.

Although the preferred embodiments of the present invention are detailed, it is apparent that one of ordinary skill in the art might envisage many kinds of variants and modifications without departing from the scope of the claims attached below.

| 10: body | 20: a firs protective member |
|---|---|
| 30: a second protective member | 40: adhesive |

The invention claimed is:

1. A protective glove comprising:
   a body into which a back of hand, a palm and fingers of a wearer are inserted;
   a first protective member made from thermosetting material, which is formed to protect a predetermined portion of the wearer's hand and exposed to outside and which is integrally attached to an outer surface of the body along a periphery of its bottom surface; and,
   a second protective member made from thermoplastic material, which is formed to protect a predetermined portion of the wearer's hand and is integrated with an inside of the first protective member, and which is attached to the outer surface of the body on its entire bottom surface.

2. The protective glove as claimed in claim 1, wherein the first protective member and the second protective member are integrated with and attached to the body in an integral manner using adhesive.

3. The protective glove as claimed in claim 1, wherein the first protective member and the second protective member are integrated with each other by simultaneous application of heat and hardening within a mold or a forming mold, wherein a bottom area of the first protective member is formed to be greater than that of the second protective member and wherein the first protective member is integrally attached to the body while the periphery of the first protective member completely surrounds the periphery of the second protective member.

4. The protective glove as claimed in claim 1, wherein the integrated first and second protective members resist against folding in a reverse direction of flexion, and accommodate folding in a forward direction of flexion.

* * * * *